UNITED STATES PATENT OFFICE.

SAMUEL PEACOCK, OF PHILADELPHIA, PENNSYLVANIA, ASSIGNOR, BY MESNE ASSIGNMENTS, TO MARDEN, ORTH & HASTINGS CO. INC., OF NEW YORK, N. Y., A CORPORATION OF MAINE.

PROCESS OF PRODUCING MAGNESIUM COMPOUNDS.

1,205,659.      Specification of Letters Patent.      Patented Nov. 21, 1916.

No Drawing.      Application filed July 15, 1915. Serial No. 40,096.

*To all whom it may concern:*

Be it known that I, SAMUEL PEACOCK, a citizen of the United States, residing at Philadelphia, in the county of Philadelphia and State of Pennsylvania, have invented certain new and useful Improvements in Processes of Producing Magnesium Compounds; and I do hereby declare the following to be a full, clear, and exact description of the invention, such as will enable others skilled in the art to which it appertains to make and use the same.

This invention relates to a process of extracting magnesium compounds from minerals and has for its object to provide a method which will be more simple, less costly, and more efficient in operation than those heretofore proposed.

With these and other objects in view the invention consists in the novel steps and combinations of steps constituting my process, all as will be more fully hereinafter disclosed and particularly pointed out in the claims.

In carrying out my process I preferably finely divide naturally occurring minerals containing magnesium such as serpentine, steatite, peridotite, etc., and treat the same with sulfuric acid. I prefer to allow the reaction to materially raise the temperature of the mixture and I also prefer to use slightly less sulfuric acid than will be sufficient to combine with all of the magnesium present. By this means I avoid the formation of acid sulfate of magnesium which is undesirable in the final product for many uses.

The reaction is preferably carried out in a suitable container such as the well known den employed in the manufacture of commercial acid phosphate and by allowing the heat of the reaction to materially raise the temperature, I avoid the formation of gelatinous silica and thereby am enabled later to more easily separate the magnesium sulfate formed from the gangue of the mineral. After the mass is cooled down it is conveniently removed from the den, and the soluble magnesium sulfate is removed by any suitable process as by lixiviation for example. The sulfate thus formed will contain impurities such as iron, etc., but it may be crystallized out and thus obtained in a comparatively pure commercial form, and free from silica. After thus producing the magnesium sulfate it of course may be readily converted into magnesium oxid or into the carbonate by any suitable and well known means.

Instead of producing magnesium sulfate or magnesium oxid by the above mode of procedure, involving the employment of an acid, I may produce the comparatively pure magnesium compounds by employing an alkali as follows: The naturally occurring magnesia bearing mineral is finely divided as above stated, and is added to an alkali solution, such as sodium hydrate, when the mixture is heated with or without pressure in a steam digester or otherwise. Or, the mineral and the alkali may be thoroughly mixed in a dry state, and roasted in any suitable type of furnace. In the latter case an oxid of magnesium and a silicate of the alkali used will be formed. When the furnace method is used the product is treated with water, and in both cases the magnesium compound is separated from the silicate by filtration or otherwise. The magnesium compounds thus produced may readily be converted into the oxid or into the sulfate or other salts by any suitable means. In both processes the magnesium salt is recovered practically free from silica, although it may contain certain other basic impurities of the mineral. The magnesium compounds thus produced are especially useful for treatment with oxychlorids to produce substantially pure anhydrous magnesium chlorid. In this connection it is of great importance that said compounds be free from silica, for otherwise it would be difficult to obtain a substantially pure anhydrous chlorid from an impure magnesium salt.

It is obvious that those skilled in the art may vary the details of the process without departing from the spirit of the invention and therefore I do not wish to be limited to the above disclosure except as may be required by the claims.

What I claim is:

1. The process of producing magnesium compounds from minerals, which consists in finely dividing a magnesium bearing mineral; treating said mineral with sulfuric acid; permitting the heat of the reaction to rise sufficiently high to prevent the formation of gelatinous silica; and suitably recovering the magnesium compound thus produced substantially as described.

2. The process of producing magnesium compounds from minerals, which consists in finely dividing a magnesium bearing mineral; treating said mineral with less sulfuric acid than is necessary to combine with all the magnesium present; permitting the heat of the reaction to rise sufficiently high to prevent the formation of gelatinous silica; and suitably recovering the magnesium compound thus produced substantially as described.

In testimony whereof I affix my signature, in presence of a witness.

SAMUEL PEACOCK.

Witness:
T. A. WITHERSPOON.